UNITED STATES PATENT OFFICE.

ARMIN R. GROB, OF WILMINGTON, DELAWARE, AND CARLETON C. ADAMS, OF PENNS GROVE, NEW JERSEY, ASSIGNORS TO E. I. DU PONT DE NEMOURS & COMPANY, OF WILMINGTON, DELAWARE, A CORPORATION OF DELAWARE.

PROCESS OF SULPHONATING CARBON COMPOUNDS.

1,422,564.  Specification of Letters Patent.  Patented July 11, 1922.

No Drawing.  Application filed June 30, 1920.  Serial No. 393,101.

*To all whom it may concern:*

Be it known that we, ARMIN R. GROB and CARLETON C. ADAMS, citizens of the United States, and residents of Wilmington, Delaware, and Penns Grove, New Jersey, respectively, have invented a certain new and useful Process of Sulphonating Carbon Compounds, of which the following is a specification.

This invention relates to the sulphonation of organic compounds, and particularly of aromatic hydrocarbons such as benzene, toluene, naphthalene, etc., and comprises bringing together sulphur trioxide and the organic compound in a medium of liquid sulphur dioxide.

We have discovered that liquid sulphur dioxide is an excellent medium in which to effect sulphonating reactions in that it permits of the use of sulphur trioxide under most favorable circumstances.

This process has the advantage of using sulphur trioxide as a sulphonating agent without incurring the disadvantage of appreciable losses by side reactions, such as charring, oxidation and sulphone formation.

The excellence of sulphur trioxide as a sulphonating agent is due first to the fact that it is very active chemically, much more so from the standpoint of sulphonation than sulphuric acid or any other sulphur compound, and second because it sulphonates by direct addition without the formation of water. Its greater activity enables a sulphonation to proceed with less excess acid and without the employment of very high temperatures which would tend to cause decomposition. By preventing the formation of water, the well-known effect of this substance in preventing isomeric rearrangement is obviated.

Sulphur trioxide when used undiluted often acts too vigorously, making the reaction difficult to control and causing a greater degree of sulphonation than that desired. It may cause charring and oxidation of the compound. It is usually diluted with sulphuric acid, but this makes a strong dehydrating mixture which favors decomposition, especially when oxygen is present in the compound, and also promotes the formation of sulphones.

By diluting the sulphur trioxide with liquid sulphur dioxide, the action of the former can be made less vigorous and the reaction more easy to control. The presence of sulphur dioxide, a strong reducing agent, lessens oxidation. Finally, since the dehydrating action is minimized by using sulphur dioxide instead of sulphuric acid as a diluent, less decomposition and sulphone formation is encountered.

As an example of the lesser side reactions taking place in this mode of sulphonation, the mono-sulphonation of benzene will be cited. When benzene is mono-sulphonated by the usual methods, one or two per cent or higher of sulphone is formed. When benzene is dissolved in an equal volume of liquid sulphur dioxide, and this added to a slight excess of sulphur trioxide, dissolved in an equal volume of liquid sulphur dioxide, even though the temperature may be allowed to reach 60° C., very little charring takes place and hardly a trace of sulphones is formed.

In practice, this type of sulphonation can be carried out in three general ways. The separate liquid sulphur dioxide solutions of the compound and of the sulphur trioxide can be added in either possible order, one to the other, or both run into a vessel at the same time. The solution of the compound can be admixed with undiluted sulphur trioxide or the sulphur trioxide solution can be admixed with the undiluted compound. Other suitable solvents can be used to dissolve either the compound or the sulphur trioxide prior to mixing. The compound can be liquid or solid, and may be present as a suspension instead of in solution. The reaction can be carried out at low or high temperatures and pressures, the practical limit being the critical temperature of sulphur dioxide.

Our invention may be illustrated by the following specific example describing the mono-sulphonating of benzene. Sulphur dioxide gas is liquefied in the usual way and the liquid allowed to flow into an evacuated vessel cooled to —10° C. An equal volume of benzene is then dissolved in the sulphur dioxide and the mass agitated by a stirrer revolving in a tight stuffing box or by revolving the closed vessel. A slight excess of liquid sulphur trioxide from the distillation of oleum (fuming sulphuric acid) is added to a second similarly designed, cooled, evacuated vessel. An equal volume of liquid sulphur dioxide is then added to the second vessel and the mixture well agitated, keeping the temperature at about 0° C. The sulphur trioxide solution is then allowed to flow slowly with agitation into the benzene solution, keeping the mixture at about 0° C. The temperature is then allowed to rise above 20° C. and preferably to about 30° C., the apparatus being tightly closed and the mass agitated for 2 or 3 hours. Heat is finally applied at the end of the reaction and the sulphur dioxide distilled back into the first chamber where it can be used for a second preparation. The benzene monosulphonate and excess sulphur trioxide is left as a thick residue.

The process outlined above is of quite general application and may be used for the sulphonation of naphthalene, anthracene, anthraquinone, and their derivatives, and various other aromatic compounds. The temperatures and pressures may vary widely, depending to some extent upon the particular compound to be sulphonated, it being desirable of course that the relation of temperature to pressure to be such as will cause the sulphur dioxide to remain in the liquid condition. The temperature at which the reagents are brought together is preferably between —15 and +15° C.

We claim:—

1. A process of sulphonating an organic compound which comprises bringing together the compound to be sulphonated and sulphur trioxide in a medium of liquid sulphur dioxide.

2. A process of sulphonating an aromatic compound which comprises bringing sulphur trioxide into contact with an aromatic compound in the presence of a diluent comprising liquid sulphur dioxide.

3. A process of sulphonating an aromatic compound which comprises bringing sulphur trioxide into contact with an aromatic compound dissolved or suspended in liquid sulphur dioxide.

4. A process of sulphonating an aromatic compound which comprises bringing sulphur trioxide into contact with an aromatic compound dissolved or suspended in liquid sulphur dioxide while maintaining the temperature between —15 and +15° C., and then allowing the temperature of the resulting mixture to rise above 20° C. under pressure.

5. A process for sulphonating an aromatic compound which comprises the admixture and interaction of a liquid sulphur dioxide suspension or solution of the compound and a liquid sulphur dioxide solution of sulphur trioxide.

6. A process for sulphonating an aromatic compound which comprises the admixture and interaction of the compound dissolved or in suspension in any suitable liquid with a liquid sulphur dioxide solution of sulphur trioxide.

7. A process for sulphonating an aromatic compound which comprises the admixture an interaction of sulphur trioxide dissolved in any suitable solvent with a liquid sulphur dioxide suspension or solution of the compound.

8. A process of sulphonating benzene which comprises bringing together benzene and sulphur trioxide in the presence of liquid sulphur dioxide.

9. A process of sulphonating benzene which comprises mixing a liquid sulphur dioxide solution of sulphur trioxide with a liquid sulphur dioxide solution of benzene, and maintaining the resulting mixture under pressure until the desired degree of sulphonation has occurred.

10. A process of mono-sulphonating benzene which comprises gradually adding to a liquid sulphur dioxide solution of benzene, with agitation, an excess of sulphur trioxide dissolved in sulphur dioxide, the temperature being maintained at about 0° C. during the addition of the sulphur trioxide, and then allowing the temperature of the mixture to rise to about 30° C. under pressure.

11. A process of sulphonating benzene which comprises mixing a liquid sulphur dioxide solution of sulphur trioxide with a liquid sulphur dioxide solution of benzene, maintaining the resulting mixture under pressure until the desired degree of sulphonation has occurred, and then distilling off the sulphur dioxide.

In testimony whereof we affix our signatures.

ARMIN R. GROB.
CARLETON C. ADAMS.